UNITED STATES PATENT OFFICE.

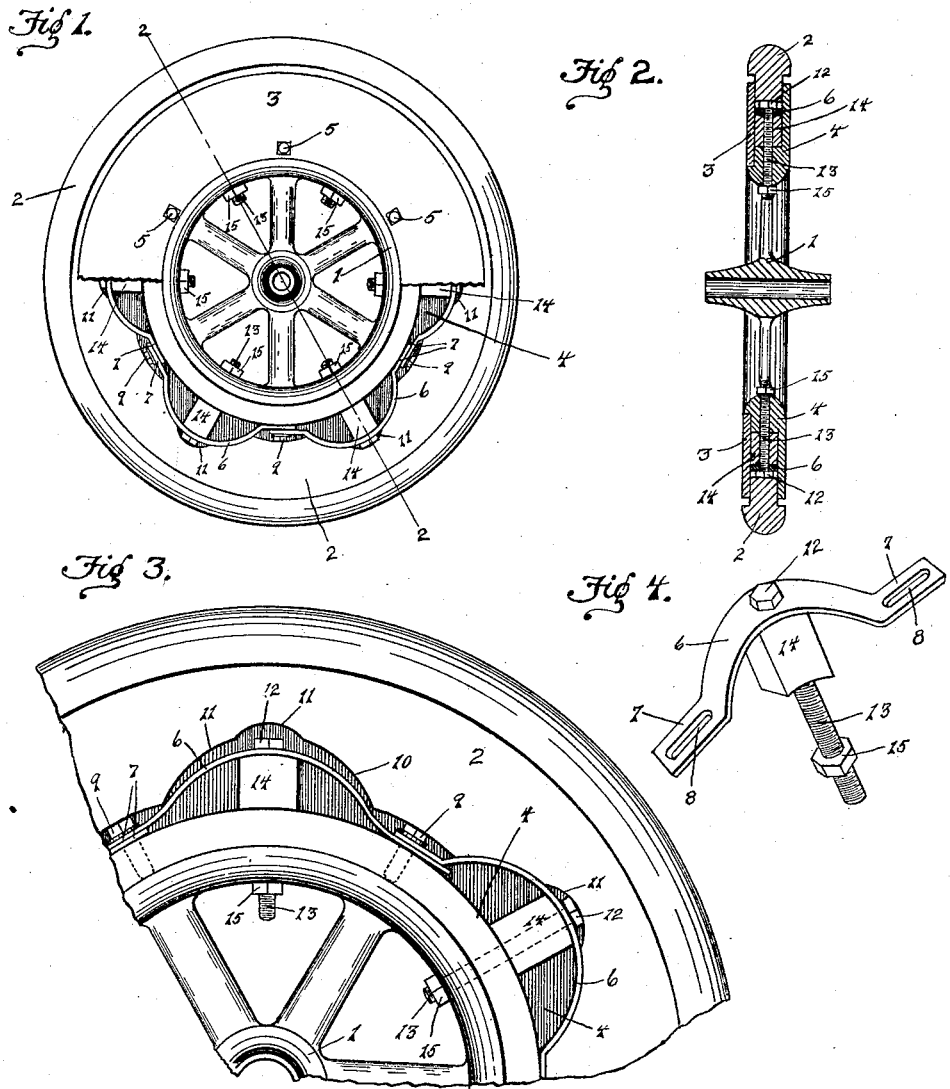

ALBERT BALL, OF CANTON, OHIO.

VEHICLE-TIRE.

1,109,159.  Specification of Letters Patent.  Patented Sept. 1, 1914.

Application filed December 13, 1913. Serial No. 806,370.

*To all whom it may concern:*

Be it known that I, ALBERT BALL, a citizen of the United States, residing at Canton, in the county of Stark and State of Ohio, have invented a new and useful Improvement in Vehicle-Tires, of which the following is a specification.

My invention relates to improvements in vehicle tires of the cushion type and the objects of the present invention are, first, to provide a tire having the desired amount of resiliency; second, to provide means for holding the tire in proper relative position with reference to the wheel; third, to provide means for easily placing the tire in position upon the wheel, and fourth, to hold the tire in true concentric relationship with the felly of the wheel upon which the tire is mounted. These objects together with other objects readily apparent to those skilled in the art I attain by the construction illustrated in the accompanying drawings, although my invention may be embodied in a variety of other mechanical forms, the construction illustrated being chosen by way of example.

In the accompanying drawing—Figure 1 is a side elevation showing a wheel equipped with my improvements, showing a portion of one of the tire holding flanges partially broken away. Fig. 2 is a section on line 2—2, Fig. 1. Fig. 3 is a fragmentary side elevation of a wheel with the tire retaining flange removed showing two portions of the tire springs, one position being expanded and the other contracted. Fig. 4 is a detached perspective view of one of the tire springs, its cushion block and retaining bolt.

Similar numerals of reference indicate corresponding parts in all the figures of the drawing.

In the accompanying drawing, 1 represents the wheel, which within itself forms no specific part of the present invention, except in connection with my improved devices calculated and designed to be attached to the wheel. For the purpose of holding the tire 2 in proper relative position upon the wheel and preventing any lateral displacement of said tire, I employ two flanges 3 and 4, which flanges are spaced apart a distance corresponding substantially with the width of the web of the tire.

For the purpose of convenience in placing the tire 2 upon the wheel and removing the same from the wheel, one of the flanges should be formed separate from the felly of the wheel and attached in any convenient and well known manner preferably by suitable bolts or screws 5. Upon the periphery of the felly are located a series of metal springs 6, which springs are arched as illustrated, and the terminations of the arched portion of the springs 6 provided with the extensions 7, which extensions are provided with the elongated slots 8. These springs 6 are arranged with reference to each other as illustrated in Figs. 1 and 3, and as illustrated these slotted extensions are lapped one upon the other and are connected to the felly of the wheel by means of suitable bolts 9, which are connected to the felly of the wheel and in such a manner that the lapped extensions 7 will be free to slip or slide upon each other. This arrangement is necessary for two purposes, first, to allow the springs to be drawn down and toward the felly as illustrated in Fig. 3, and second, to provide for approaching and receding of the various springs whereby the desired amount of resiliency is produced.

The tire 2 is preferably formed of hard rubber, solid and of sufficient rigidity to withstand the ordinary uses such as are common to tires of the class to which this invention pertains. The web of the tire is provided with a series of recesses 10 which are of a size and shape to correspond substantially with the form of the bow portions of the springs 6, except the portions 11 of said recesses which are formed of sufficient depth to receive the heads 12 of the spring controlling bolts 13. Between the inner surfaces of the springs 6 and the periphery of the felly are located a series of cushion blocks 14, which cushion blocks are formed of rubber or like material and of sufficient elasticity to allow the proper compression and expansion as the bow portions of the springs 6 approach and recede from the felly. These cushion blocks are for the purpose of receiving and cushioning heavy thrusts imparted to the springs, thereby relieving the sudden shocking of the springs, but at the same time providing for sufficient elasticity to give the proper resiliency to the tire.

The bolts 13 are drawn inward by turning the nuts 15 in one direction, and by drawing the bolts 13 inward the bow portions of the springs 6 are moved toward the periphery of the felly and at the same time the cushion blocks 14 are compressed, and when the parts are in this condition the tire 2 can be easily and quickly placed in proper position, and after said tire has been so placed, the springs 6 are sufficiently released to be snugly seated in the recesses 10 as shown in Fig. 1, and on the right hand side of Fig. 3 and when the springs 6 have been thus released the tire 2 will be firmly and snugly held in position. It will also be understood that by the proper adjustment of the various springs the tire 2 can be brought into true concentric relationship with reference to the felly.

It will be understood that the removable plate 3 should be detached when it is desired to place a tire in position upon the wheel and after the tire has been so placed and the springs properly released said plate can be connected and when properly connected as illustrated in Fig. 1 the tire proper will be held against displacement.

It will be understood that by forming the recesses 10 and seating the spring 6 snugly into said recesses that the tire will be held against any slipping action upon the felly. It is well understood that at least two wheels of an automobile or like vehicle are propelling wheels, and that it is of importance to provide against any relative slipping movement as between the felly and the tire. This feature is of more importance than in horse drawn vehicles, owing to the fact that in horse drawn vehicles a rolling motion is imparted to the wheels by a pull upon the axle and no wheels of a horse drawn vehicle are in a sense propelling wheels but simply carry the vehicle.

Having fully described my invention what I claim as new and desire to secure by Letters Patent, is—

1. A resilient wheel comprising a felly provided with spaced flanges, one of said flanges fixed to the felly and the other flange detachable therefrom, a series of arched springs located around the periphery of the felly and between said flanges, the free ends of said springs adapted to overlap each other and provided with slots, bolts located through the slots and into the felly, a tire provided with a web located between said flanges, said web provided with concaved recesses corresponding substantially with the form of the springs, said springs adapted to normally engage the walls of said recesses and means for drawing said springs out of contact with said recesses.

2. A resilient wheel comprising a felly provided with spaced flanges, one of said flanges fixed to the felly and the other flange detachable therefrom, a series of arched springs located around the periphery of the felly and between said flanges, the free ends of said springs adapted to overlap each other and provided with slots, bolts located through the slots and into the felly, resilient cushions located between the arch in said springs and the felly, a tire provided with a web, said web provided with concaved recesses corresponding substantially with the form of the springs, said springs adapted to normally engage the walls of said recesses and means for drawing said springs out of contact with said recesses.

3. A resilient wheel comprising a felly provided with spaced flanges, one of said flanges fixed to the felly and the other flange detachable therefrom, a series of arched springs located around the periphery of the felly and between said flanges, the free ends of said springs adapted to overlap each other and provided with slots, bolts located through the slots and into the felly, resilient cushions located between the arch of each spring and the felly, a tire provided with a web, said web provided with concaved recesses corresponding substantially with the form of the springs, said springs adapted to normally engage the walls of said recesses and means for drawing said springs out of contact with said recesses, said means comprising a bolt located through the arch of each spring and through the resilient cushion and felly and provided with a nut upon the inside of the felly.

4. A resilient wheel comprising a felly provided with spaced flanges, one of said flanges fixed to the felly and the other flange detachable therefrom, a series of arched springs located around the periphery of the felly and between said flanges, the free ends of said springs adapted to overlap each other and provided with slots, bolts located through the slots and into the felly, a resilient cushion located between the arch of each spring and the felly, a tire provided with a web adapted to be located between the spaced flanges on the felly, said web provided with concaved recesses corresponding substantially with the form of the springs, said springs adapted to normally engage the walls of said recesses, means for drawing said springs out of contact with said recesses, said means consisting of a bolt located through the arch of each spring and through the resilient cushion and felly and provided with a nut upon the inside of the felly, and an enlarged tread portion upon said tire, concentric to and spaced from said spaced flanges.

In testimony that I claim the above, I have hereunto subscribed my name in the presence of two witnesses.

ALBERT BALL.

Witnesses:
 SYLVIA BORON,
 F. W. BOND.